Patented Apr. 26, 1949

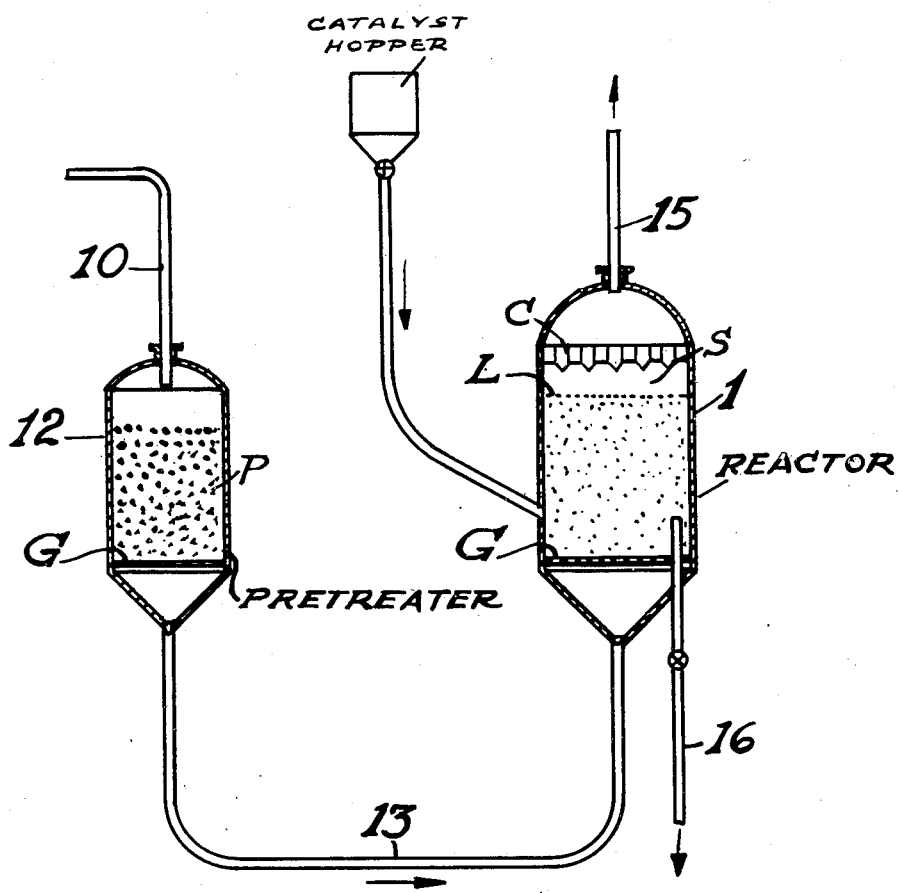

2,468,510

UNITED STATES PATENT OFFICE 2,468,510

PRETREATMENT OF GASES FOR THE SYNTHESIS OF HYDROCARBONS

John J. Owen, Baton Rouge, La., assignor to Standard Oil Development Company, a corporation of Delaware Application December 14, 1945, Serial No. 635,099

4 Claims. (Cl. 260—449.6)

My invention is fully described in the following specification and claims, including the accompanying drawing forming a part of this specification.

At the present time, considerable research is being conducted on the problem of synthesizing hydrocarbons, including hydrocarbons boiling in the gasoline and gas oil range, the hydrocarbons being synthesized from carbon monoxide and hydrogen. The literature contains patents and publications describing various processes for effecting a reaction between carbon monoxide and hydrogen resulting in the production of normally liquid hydrocarbons. In many of the patented and unpatented processes described in the literature, the catalyst employed by this reaction is metallic cobalt carried on kieselguhr and promoted with relatively small amounts of thoria. The cobalt type of catalyst generally employs a ratio of two moles of hydrogen per mole of CO in the feed gas. There are other processes in which the catalyst is metallic iron. In this type of operation, the temperatures and pressures employed are somewhat higher than those employed when the catalyst is cobalt. The iron-type catalyst yields a product which is of improved octane rating, and the operation is effected using a feed gas containing one mole of CO per mole of hydrogen. Needless to say, during the development of the hydrocarbon synthesis process, many difficulties have arisen. In particular, in attempting to operate the process with a powdered iron catalyst, the so-called fluidized catalyst type of operation, the difficulties attendant on the process are many and numerous problems have been presented. One of the problems in connection with the hydrocarbon synthesis operation is that of deterioration or fouling of the catalyst with sulfur-containing bodies and other contaminating materials in the feed gas. This impairment of the catalyst by the presence of sulfur and other materials in the feed gas causes a more rapid deactivation of the catalyst in the type of operation in which a fluidized mass of catalyst is employed than where the catalyst is in the form of a fixed or stationary bed. In the latter type of unit, the first portion of the catalyst bed contacted by the reaction gases acts in a gas "clean up capacity" for the gas feed. Thus, the gas passing to the latter contacted portions of the fixed bed is purified. This situation does not, of course, exist where the catalyst is in the form of a fluidized mass since in this type of operation, as is well known, the catalyst, due to its turbulence, undergoes thorough mixing so that temperatures, and deposition of undesired materials on the catalyst, are substantially uniform and homogenous throughout the whole mass. In other words, the fluidized catalyst type of operation presents a problem which is not so troublesome in the fixed-bed type of operation, for the reasons indicated, and my present improvements relate to the pretreatment of the synthesis gas going to a reactor containing a fluidized mass of catalyst and in a preferred form, a fluidized mass of powdered iron catalyst.

The object of my invention is to purify a feed gas comprising carbon monoxide and hydrogen by removing therefrom deleterious substances such as sulfur and its compounds, as well as other materials as harmful to a fluid catalyst employed in the synthesis of hydrocarbons from the foregoing feed gas.

To the accomplishment of the foregoing and related objects, I treat a hydrocarbon synthesis feed gas containing impurities with a treating metal such as copper in a feed purifying zone at elevated temperatures and otherwise as hereinafter more fully explained whereby I remove catalyst poisoning impurities from the said feed gas before the latter is forced into contact with said catalyst in a hydrocarbon synthesis zone.

In the accompanying drawings, I have shown by means of a diagram sufficient apparatus to illustrate the manner in which a preferred embodiment of my invention may be carried into practical effect.

Referring in detail to the drawing, I represents a fluid reactor consisting essentially as shown of a cylindrical shell having a conical base and a dome-shaped crownpiece. The reactor is preferably provided with a grid, G. During the reaction, the reactor contains a dense turbulent suspension of powdered catalyst (iron or cobalt) in a synthesis gas, the synthesis gas flowing into the reactor through a line 13, then through grid G into the main body of the reactor where the superficial gas velocity is controlled in known manner to form the dense suspension. Depending on the amount, that is the actual pounds of catalyst fed to the reactor and of course its diameter and height, the dense suspension will have an upper level at some point L, above which the catalyst concentration decreases rapidly, so that product gases issuing from the reactor through line 15 contain a minimum amount, if any, of powdered catalyst. The space between L and the exit line 15 is a disengaging space S in which catalyst settles by gravity into the space between G and L, and usually in the upper portion of the disengaging space there is disposed a plurality of centrifugal separators C through which the product gases are forced for the purpose of removing fines and coarse entrained catalyst; and the product is withdrawn through line 15 and delivered to purification and recovery equipment (not shown) to obtain desired products such as gasoline. Fouled catalyst may be withdrawn at 16, revivified, cooled and recycled to the reactor according to known procedure.

Since the main novelty contained in my present invention relates to pretreating the gases to remove sulfur compounds and other contaminants, there is placed ahead of the reactor 1 a treating vessel P containing a bed (stationary) of a metallic treating agent such as copper deposited or carried on alumina, through which the contaminated feed gas consisting essentially of carbon monoxide and hydrogen entering through line 10 is forced. The treating agent is in the form of granules, pills, pellets or shaped bodies. The gas flows downwardly through the bed of treating material 12, is withdrawn at 13 and thence forced into the reactor 1 as previously described where it is subject to hydrocarbon synthesis conditions of temperature, contact time, pressure, etc. These conditions are known in the published art for both the process using a cobalt catalyst and that employing iron as the catalyst.

Example 1

With respect to the conditions of treatment of the synthesis gas, to purify the same, I caused a synthesis gas containing hydrogen and carbon monoxide gas in a volume ratio of 2 volumes of hydrogen per volume of carbon monoxide to be passed over a catalyst containing 65 weight per cent metallic copper on 35 per cent alumina with a decrease in sulfur content as indicated in the table below. The catalyst was prepared by impregnating aluminum hydrate ($Al_2O_3.3H_2O$) with $Cu(NO_3)_2$, so proportioned as to give the foregoing percentage of metallic copper. This impregnated aluminum hydrate was dried, treated with ammonia to precipitate copper hydroxide, again dried, and then treated with hydrogen at a temperature of 700° F. for 4 hours in order to convert the copper hydroxide and/or oxide into metallic copper. Then, using this catalyst, I made two runs, A and B, at different temperatures and feed rates as set forth below, with the following results:

|  | A | B |
|---|---|---|
| Temperature, °F | 325 | 580 |
| V./V./Hr.[1] | 1,400 | 600 |
| Total Sulfur, P. P. M.[2]: | | |
| Feed | 410 | 400 |
| Product | 3 | 2 |

[1] V./V./Hr.=volumes of synthesis gas measured at 32° F. and 1 atmosphere pressure per hour per volume of catalyst.
[2] P. P. M.=parts per million.

Example 2

In another run I caused a synthesis gas containing hydrogen and carbon monoxide in the molar ratio of 1/1 to be contacted in vessel P with the same catalyst as used in Example 1 at a space velocity of 2500 volumes of gas per volume of catalyst per hour. The sulfur content of the inlet gas was six parts per million. This was reduced to essentially zero parts per million in the synthesis gas exiting at line 13.

The desulfurization may be carried out at atmospheric or superatmospheric pressures, in either fixed bed or fluid type of operation. However, the choice of desulfurizing catalyst will depend to a certain extent upon the temperature and pressure of operation of the desulfurizer, since it is necessary to select a metal which will not by reaction with carbon monoxide in the synthesis gas mixture to be treated form a carbonyl under the desulfurization conditions used. Only nickel and iron form carbonyls at atmospheric pressure and hence would be unsatisfactory for low pressure operation unless used at temperatures above those at which their carbonyls decompose. Molybdenum carbonyl is formed at 392° F. and 200 atmospheres, hence molybdenum is a satisfactory component of a desulfurizing material for this process when operating at pressures of one to fifty atmospheres, for example. Since metal carbonyls are unstable at higher temperatures, by operation of the desulfurizer at suitable temperature levels carbonyl formation may be avoided and a wider choice of metals becomes available for the desulfurization step. Suitable treating metals which may be used as components of the desulfurizer catalyst are: copper, aluminum, chromium, tungsten, manganese, molybdenum, and vanadium.

Numerous modifications of my invention falling within the scope thereof may be made by those who are familiar with this art.

What I claim is:

1. In the catalytic synthesis of normally liquid hydrocarbons from a feed stock comprising impure carbon monoxide and hydrogen, the improvement which comprises contacting the feed stock in a desulfurization zone at desulfurization conditions of temperature and pressure exclusively with a solid desulfurization agent the active desulfurization component of which consists of a metal which does not form a metal carbonyl under the desulfurization conditions used and thereafter directly with a dense, turbulent, fluidized suspension of powdered hydrocarbon synthesis catalyst in a separate synthesis zone under synthesis conditions conducive to the formation of normally liquid hydrocarbons and preventing the entry of desulfurizing agent into said synthesis zone.

2. The method set forth in claim 1 in which the pretreatment of the feed gas is performed by contacting it with copper carried on alumina.

3. The process of claim 1 in which said metal is copper.

4. The process of claim 1 in which said metal is molybdenum.

JOHN J. OWEN.

REFERENCES CITED

The following references are of record in the file of this patent:

UNITED STATES PATENTS

| Number | Name | Date |
|---|---|---|
| 956,734 | Sabatier | May 3, 1910 |
| 1,787,795 | Porter | Jan. 6, 1931 |
| 1,828,734 | Dormon | Oct. 27, 1931 |
| 2,360,787 | Murphree | Oct. 17, 1944 |
| 2,393,909 | Johnson | Jan. 29, 1946 |

OTHER REFERENCES

Ellis, "The Chemistry of Petroleum Derivatives," vol. II, page 1246, Reinhold, New York, 1937.